US012639726B1

(12) United States Patent
Arora et al.

(10) Patent No.: US 12,639,726 B1
(45) Date of Patent: May 26, 2026

(54) NEXT STATE PREDICTION USING LIKELIHOOD ESTIMATES

(71) Applicant: Walmart Apollo, LLC, Bentonville, AR (US)

(72) Inventors: Raj Deep Arora, Secaucus, NJ (US); Srujana Kaddevarmuth, San Jose, CA (US); Mounica Urity, Mountain View, CA (US); Topojoy Biswas, Pleasanton, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/034,808

(22) Filed: Jan. 23, 2025

(51) Int. Cl.
*G06Q 30/02* (2023.01)
*G06Q 30/0242* (2023.01)

(52) U.S. Cl.
CPC ................................ *G06Q 30/0244* (2013.01)

(58) Field of Classification Search
CPC .................................. G06Q 30/0207–30/0277
See application file for complete search history.

(56) References Cited

U.S. PATENT DOCUMENTS

| 11,816,272 | B2 * | 11/2023 | Yan | G06F 3/017 |
| 12,124,948 | B2 * | 10/2024 | Sinha | G06F 18/2148 |
| 2012/0166532 | A1 * | 6/2012 | Juan | G06Q 30/0224 |
| | | | | 709/204 |
| 2013/0124310 | A1 * | 5/2013 | Barbieri | G06Q 30/02 |
| | | | | 705/26.7 |

| 2016/0055519 | A1 * | 2/2016 | Chittilappilly | G06Q 30/0244 |
| | | | | 705/14.43 |
| 2016/0055541 | A1 * | 2/2016 | Calistri-Yeh | G06F 16/9535 |
| | | | | 705/14.66 |
| 2016/0210658 | A1 * | 7/2016 | Chittilappilly | G06Q 30/0246 |
| 2017/0032417 | A1 * | 2/2017 | Amendjian | G06Q 30/0254 |
| 2017/0091810 | A1 * | 3/2017 | McGovern | G06Q 30/0247 |
| 2017/0323330 | A1 * | 11/2017 | Chittilappilly | G06N 20/00 |
| 2017/0337588 | A1 * | 11/2017 | Chittilappilly | G06Q 30/0244 |
| 2018/0374138 | A1 * | 12/2018 | Mohamed | G06Q 30/0631 |

(Continued)

FOREIGN PATENT DOCUMENTS

| CN | 1170355556 | A1 | 11/2023 |
| WO | WO-2015066331 | A1 * | 10/2014 |

OTHER PUBLICATIONS

Brodersen et. al, "Inferring Casual Impact Using Bayesian Structural Time-Series Model," Institute of Mathematical Statistics, 2015, p. 247-274.

(Continued)

*Primary Examiner* — Thuy N Nguyen
(74) *Attorney, Agent, or Firm* — Morgan, Lewis & Bockius LLP; Manita Rawat

(57) ABSTRACT

Example implementations related to next state prediction and action selection are disclosed. In an example, an initial state is estimated based on a set of priors including at least one engagement opportunity. A diminishing effect of the at least one engagement opportunity is determined using a non-linear transformation and a set of likelihood estimates for the initial state is generated using a Bayesian steady state filter model that receives the initial state and the diminishing effect of the at least one engagement opportunity. A next state is predicted based on the initial state and the set of likelihood estimates.

17 Claims, 8 Drawing Sheets

(56)                        References Cited

U.S. PATENT DOCUMENTS

| | | | |
|---|---|---|---|
| 2019/0034961 A1* | 1/2019 | Gierach | G06Q 30/0244 |
| 2019/0095947 A1* | 3/2019 | Sato | G06F 3/0488 |
| 2021/0171576 A1* | 6/2021 | Houry | C07K 7/54 |
| 2022/0012777 A1* | 1/2022 | Nomula | G06Q 30/0277 |
| 2023/0281643 A1* | 9/2023 | Dutta | G06Q 30/0202 |
| | | | 705/7.29 |
| 2025/0166036 A1* | 5/2025 | Hu | G06Q 30/0633 |

OTHER PUBLICATIONS

Zhao et. al, "Using casual inference to measure business impact after program launch," Medium, May 7, 2024, p. 1-6.
Iyengar et. al, "The Impact of Subscription Programs on Customer Purchases," Jan. 2020, p. 1-59.
Mccormick, "Nauseam: The Effects of Repeated ADS, and How Better Targeting can Help," Nov. 4, 2024, p. 1-7.

* cited by examiner

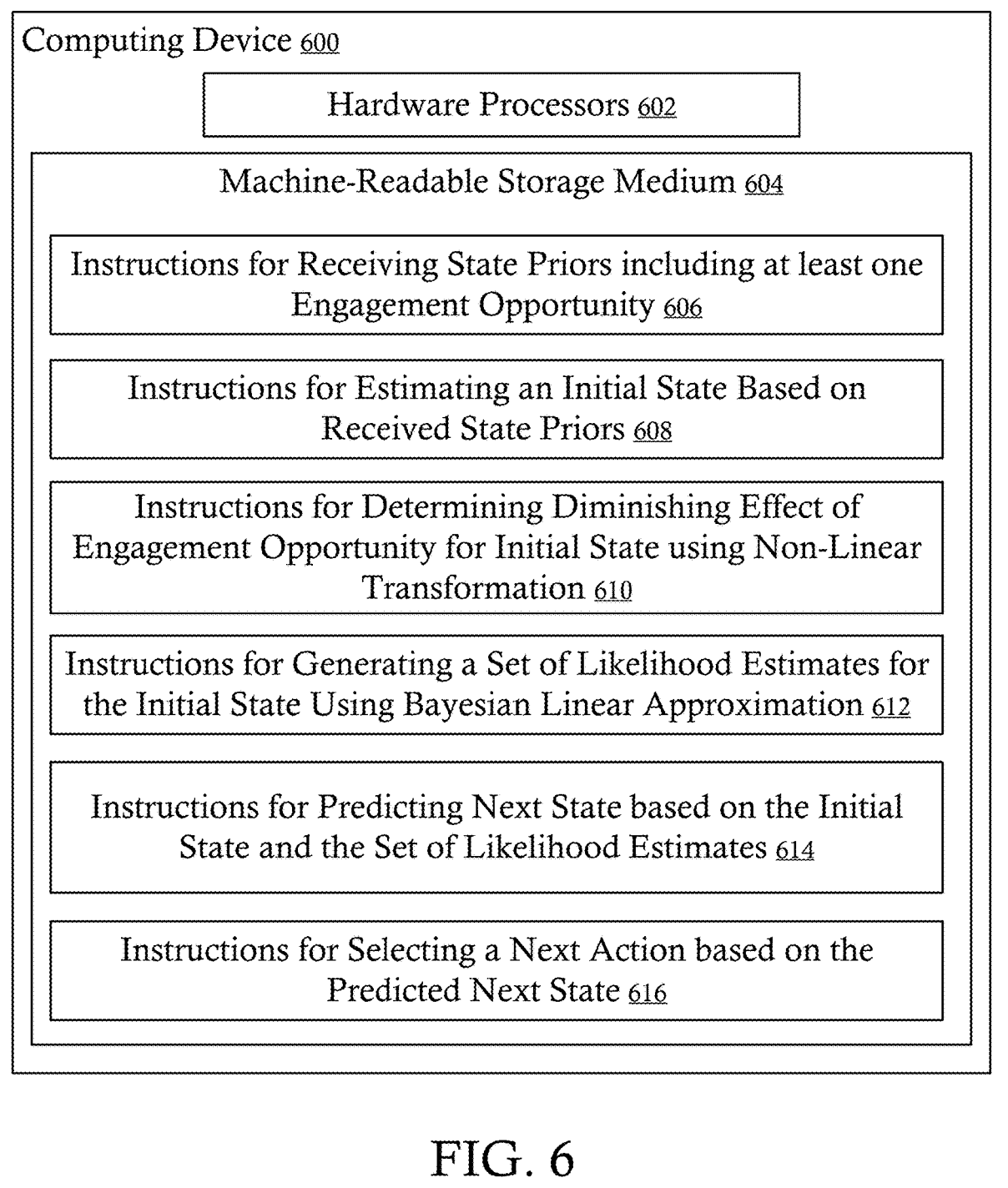

Computing Device <u>600</u>

Hardware Processors <u>602</u>

Machine-Readable Storage Medium <u>604</u>

Instructions for Receiving State Priors including at least one Engagement Opportunity <u>606</u>

Instructions for Estimating an Initial State Based on Received State Priors <u>608</u>

Instructions for Determining Diminishing Effect of Engagement Opportunity for Initial State using Non-Linear Transformation <u>610</u>

Instructions for Generating a Set of Likelihood Estimates for the Initial State Using Bayesian Linear Approximation <u>612</u>

Instructions for Predicting Next State based on the Initial State and the Set of Likelihood Estimates <u>614</u>

Instructions for Selecting a Next Action based on the Predicted Next State <u>616</u>

FIG. 6

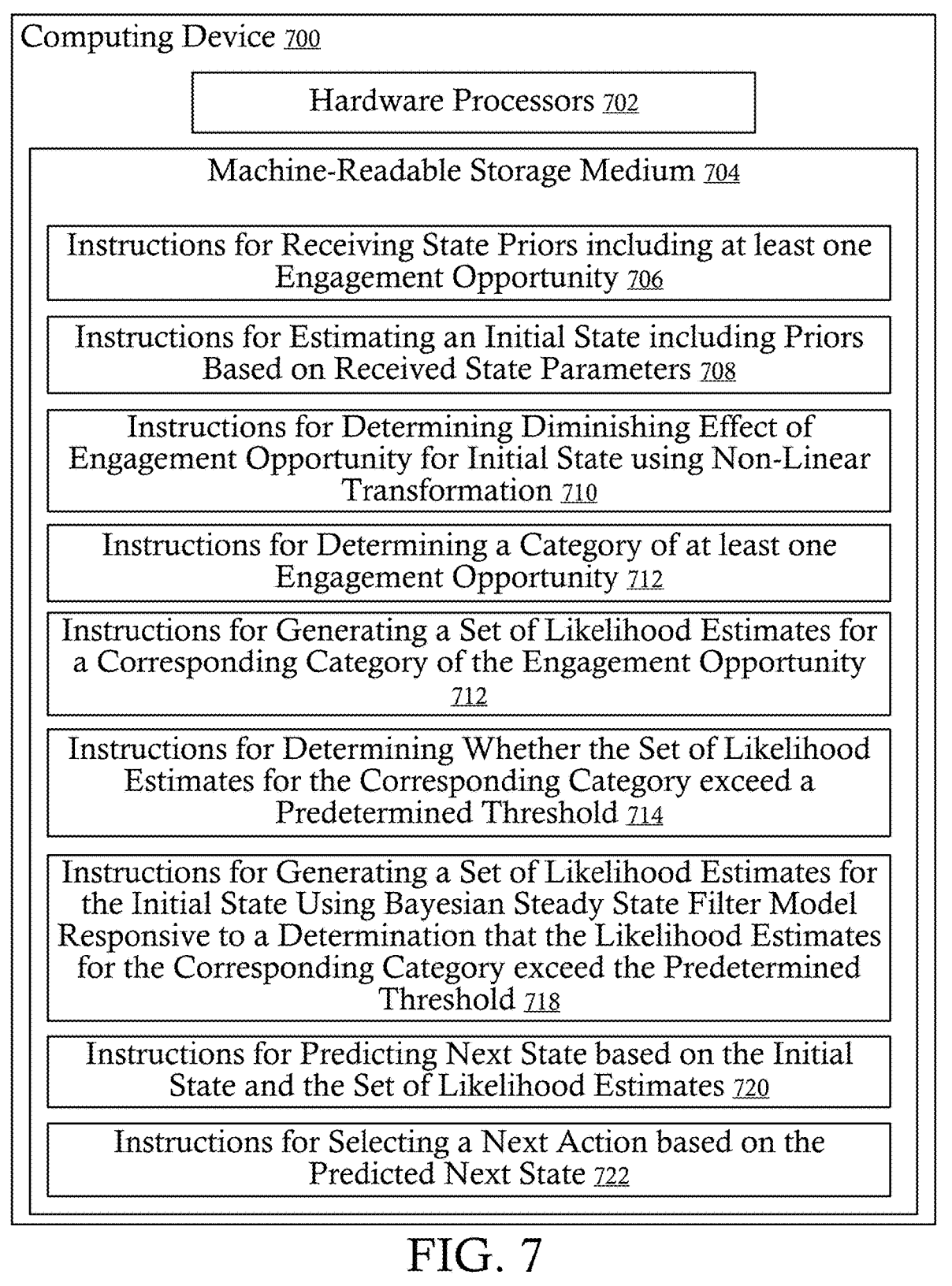

Computing Device 700

Hardware Processors 702

Machine-Readable Storage Medium 704

Instructions for Receiving State Priors including at least one Engagement Opportunity 706

Instructions for Estimating an Initial State including Priors Based on Received State Parameters 708

Instructions for Determining Diminishing Effect of Engagement Opportunity for Initial State using Non-Linear Transformation 710

Instructions for Determining a Category of at least one Engagement Opportunity 712

Instructions for Generating a Set of Likelihood Estimates for a Corresponding Category of the Engagement Opportunity 712

Instructions for Determining Whether the Set of Likelihood Estimates for the Corresponding Category exceed a Predetermined Threshold 714

Instructions for Generating a Set of Likelihood Estimates for the Initial State Using Bayesian Steady State Filter Model Responsive to a Determination that the Likelihood Estimates for the Corresponding Category exceed the Predetermined Threshold 718

Instructions for Predicting Next State based on the Initial State and the Set of Likelihood Estimates 720

Instructions for Selecting a Next Action based on the Predicted Next State 722

FIG. 7

NEXT STATE PREDICTION USING LIKELIHOOD ESTIMATES

TECHNICAL FIELD

This application relates generally to next state prediction, and more particularly, to next state prediction using a set of likelihood estimates.

BACKGROUND

Some interface systems provide for interactions with engagement opportunities linked to certain benefits or operations of a network system. These interface systems may promote or prioritize engagement opportunities that increase one or more metrics. Modeling may provide predictions of engagement opportunities that increase the one or more metrics.

BRIEF DESCRIPTION OF THE DRAWINGS

Various examples will be described below with reference to the following figures.

FIG. 6 depicts an example system with a machine-readable medium that includes instructions for next state prediction, in accordance with some embodiments.

FIG. 7 depicts an example system with a machine-readable medium that includes instructions for next state prediction based on a category, in accordance with some embodiments.

DETAILED DESCRIPTION

Figure 1:
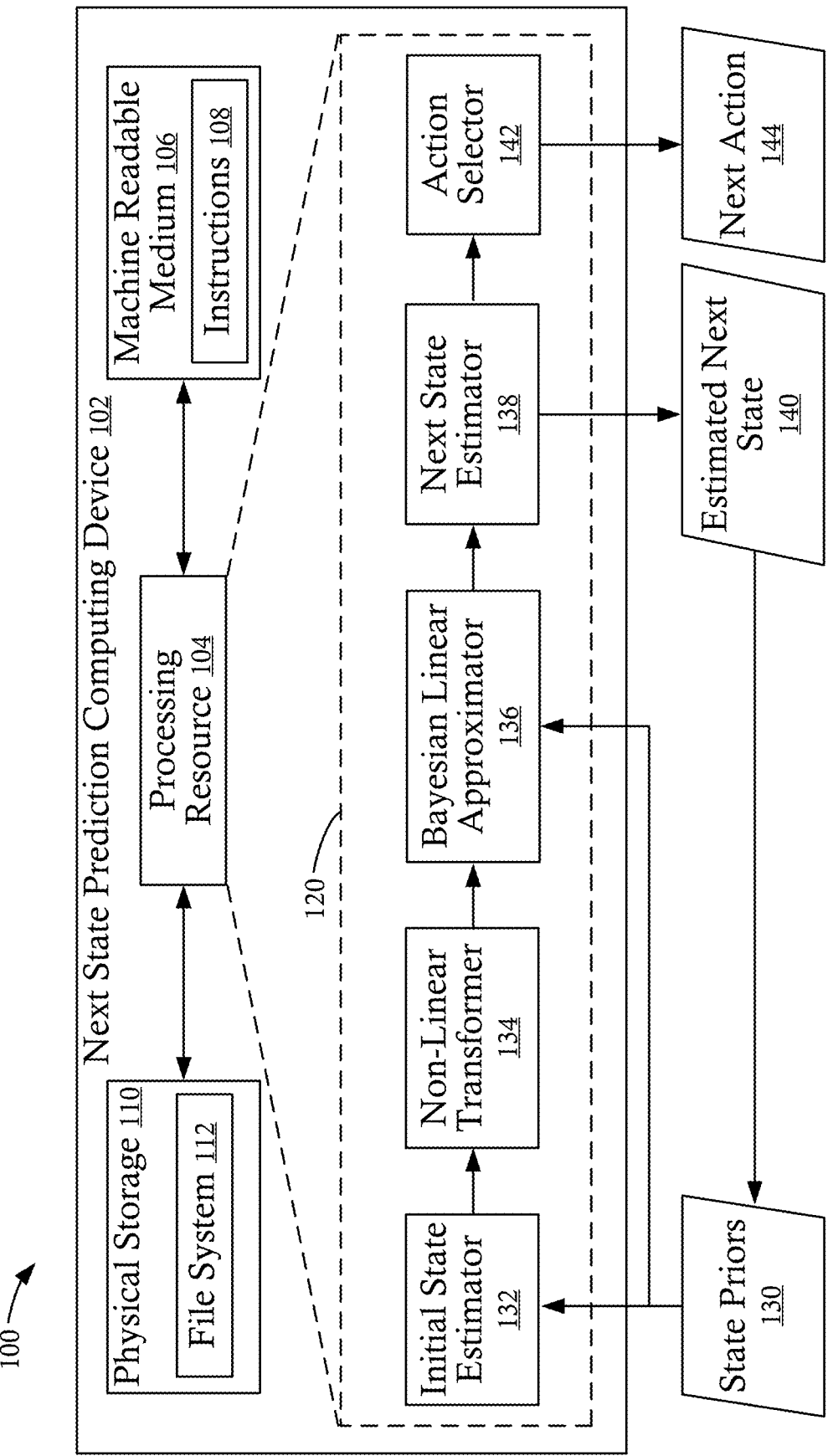
FIG. 1 depicts an example system for next state prediction, in accordance with some embodiments.

Some current systems utilize A/B testing that includes presentation of different interfaces (e.g., an A interface and a B interface) to determine causal effects for engagement elements or opportunities. However, such randomized experiments may not be viable for a number of reasons, such as historical interventions (e.g., lack of control group), budget constraints (e.g., lack of financial ability to run randomized testing), slow-moving long-term metrics (e.g., metrics requiring a long period to reach a statistically significant sample size), selection bias (e.g., engagement opportunity is not assigned), large interventions (e.g., cannot be shown to half of a target audience), upstream-model shortcomings (e.g., correlation vs. causation outputs), multi-treatment scenarios (e.g., cannot account for more than one engagement opportunity being applied at a time), and consideration of diminishing effects (e.g., cannot determine reduced effects of repeated exposure). Additionally, although A/B testing may be suitable for stable systems, A/B testing is not suitable for systems that include expanding system growth and engagement opportunities (e.g., enrollment programs or systems), which each include an individual awareness, adoption, and behavioral change, as such testing cannot accurately measure temporal effects of engagement opportunities for desired metrics.

The disclosed systems and methods provide a next state prediction mechanism for generating expected engagement and/or subsequent states with respect to one or more presented engagement opportunities. The engagement opportunities may be presented via a user interface. The next state prediction mechanism accounts for and/or eliminates the shortcomings of prior systems. For example, the disclosed systems and methods utilize causal measurement techniques to simultaneously measure the impact of multiple factors and/or multiple engagement opportunities. The disclosed next state prediction systems and methods provide faster and more efficient processing, implementation of multiple causal techniques to provide causal-impact estimation, standardized causal inputs and outputs, standardized experimentation frameworks, and a monitoring and governance framework for debiasing measurements while providing a robust framework for model explainability and interpretability.

In various embodiments, the disclosed next state prediction systems and methods provide a causal attribution system that includes a robust framework that is attributable (e.g., results are within an expected distribution), has precision and reliability (e.g., accurately identifies causal relationships and quantifies the strengths of those relationships), and is reproducible and consistent. The disclosed system and methods further scale effectively and are data-driven to provide sensitivity to confounding variables, counterfactual reasoning, and interoperability. In some embodiments, the disclosed next state prediction systems and methods provide next state prediction for selecting engagement elements and/or engagement opportunities for presentation to users via a user interface while being resource-efficient.

In various embodiments, a system including a processor and a non-transitory memory storing instructions is disclosed. The instructions, when executed, cause the processor to estimate an initial state of an enrollment program based on a set of state priors including at least one engagement opportunity, determine a diminishing effect of the at least one engagement opportunity using a non-linear transformation, generate a set of likelihood estimates for the initial state using a Bayesian steady state filter model that receives the initial state of the enrollment program and the diminishing effect of the at least one engagement opportunity, and predict a next state of the enrollment program based on the initial state of the enrollment program and the set of likelihood estimates.

In various embodiments, a computer-implemented method is disclosed. The computer-implemented method includes steps of estimating an initial state of a user based on a set of probability priors including at least one engagement opportunity, determining a diminishing effect of the at least one engagement opportunity using a non-linear transformation, generating a set of likelihood estimates for the initial state of the user using a Bayesian steady state filter model that receives the initial state of the user and the diminishing effect of the at least one engagement opportunity, and predicting a next state of the user based on the initial state of the user and the set of likelihood estimates.

In various embodiments, a non-transitory computer-readable medium having instructions stored thereon is disclosed. The instructions, when executed by at least one processor, cause at least one device to perform operations including estimating an initial state of a system based on a set of state priors including at least one engagement opportunity, determining a diminishing effect of the at least one engagement opportunity using a non-linear transformation, generating a set of likelihood estimates for the initial state of the system using a Bayesian steady state filter model that receives the initial state of the system and the diminishing effect of the at least one engagement opportunity, and predicting a next state of the system based on the initial state of the system and the set of likelihood estimates.

This description of the example embodiments is intended to be read in connection with the accompanying drawings that are to be considered part of the entire written description. Terms concerning data connections, coupling and the like, such as "connected" and "interconnected" and/or "in signal communication with," refer to a relationship wherein systems or elements are electrically connected (e.g., wired, wireless) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these example embodiments in connection with the accompanying drawings.

Furthermore, in the following, various embodiments are described with respect to methods and systems for next state prediction. In various embodiments, the disclosed next state prediction systems and methods enable computationally efficient and accurate predictions of future states (e.g., for a user, system, or process). The disclosed systems and methods utilize a Bayesian steady state filter model to generate sets of likelihood estimates for future states. A predicted next state is selected based on a set of likelihood estimates and the initial starting state of a system, such as the initial starting state of a system including an enrollment program. Predicted next states may be used for one or more additional processes, such as interface generation, interface analysis, or any other suitable process.

FIG. 1 depicts an example system 100 that provides next state prediction, in accordance with some embodiments. The system 100 includes a next state prediction computing device 102 that provides a next state predictor 120 that predicts one or more next states for one or more other processes, systems, and/or users. The next state prediction computing device 102 includes a processing resource 104 that may include one or more microcontrollers, microprocessors, field-programmable gate arrays (FPGAs), application-specific integrated circuits (ASICs), state machines, digital circuitry, and/or any other suitable processing resource. The next state prediction computing device 102 includes a non-transitory machine-readable medium 106 that may include one or more of a random access memory (RAM), read-only memory (ROM), electrically erasable programmable read-only memory (EEPROM), flash memory, hard disk, and/or any other suitable memory resource.

The processing resource 104 may execute instructions 108 (i.e., programming or software code) stored on machine-readable medium 106 to perform functions of the next state prediction computing device 102, such as generating one or more sets of likelihood estimates for an initial state or generating an estimated next state output. The instructions 108 may include instructions for implementing one or more models. In some embodiments, and as will be described further herein below, the next state prediction computing device 102 may execute one or more models, processes, or algorithms, such as a machine learning model, deep learning model, statistical model, etc., (e.g., as implemented as machine-readable instructions) to generate an estimated next state (e.g., to generate a next state prediction).

The next state prediction computing device 102 may also include other hardware components, such as physical storage 110. Physical storage 110 may include any physical storage device (a hard disk drive, a solid state drive, or the like) or a plurality of such storage devices (e.g., an array of disks), and may be locally attached (e.g., installed) in the next state prediction computing device 102. In some implementations, physical storage 110 may be accessed as a block storage device.

In some cases, the next state prediction computing device 102 may also include a local file system 112 that may be implemented as a layer on top of the physical storage 110. For example, an operating system may be executing on the next state prediction computing device 102 (by virtue of the processing resource 104 executing certain instructions 108 related to the operating system) and the operating system may provide a file system 112 to store data on the physical storage 110.

The next state prediction computing device 102 may be in communication with one or more additional devices over one or more network channels. For example, in various embodiments, the next state prediction computing device 102 may be in communication with a web server, a cloud-based engine including one or more processing devices that may be provisioned for use, a database, a workstation, and/or any other suitable system or device. The next state prediction computing device 102 may similarly be in communication, either directly or indirectly, with one or more user computing devices operatively coupled over the network. The other computing systems may be similar to the next state prediction computing device 102 and may each include at least a processing resource and a machine-readable medium.

In some embodiments, one or more state priors 130 are received by the next state predictor 120, for example, by an initial state estimator 132. The state priors 130 (also referred to herein as probability priors) include data representative of prior states of a system, a system process, a system implemented program, one or more users of a system, and/or one or more engagement opportunities. The state priors 130 may include elements such as an enrollment status in one or more programs or processes, engagement elements or opportunities that were presented to a user and/or may have been presented to a user during a prior state, historical interaction data, and/or any other suitable data. In some embodiments, the state priors 130 are associated with a first user and represent a user interaction journey with one or more network processes or interfaces over a predetermined time period. In some embodiments, the state priors 130 represent an initial state of an enrollment program implemented by a network system.

The state priors 130 may include data representative of at least one engagement opportunity. An engagement opportunity may include one or more interaction elements or interaction processes available to users of a corresponding system. Interaction elements may include, for example, specific interface elements provided on a user interface and that provide specific functionality when a user interacts with the interface element (e.g., displaying a specific interface page, specific item, or specific action). Interaction processes may include one or more processes that may be executed by users of the corresponding systems such as, for example, rewards operations, redemption operations, etc. Although example embodiments are discussed herein, it will be appreciated that any suitable engagement opportunity may be included in the state priors 130 and/or provided through a user interface.

In some embodiments, the state priors 130 define one or more target impacts to be maximized for a next state prediction. For example, the state priors 130 may define one or more metrics or campaign goals to be maximized. Example metrics include, but are not limited to, engagement rate, click rate, revenue generation, retention rate, and conversion rate. Although certain examples are discussed herein, it will be appreciated that the state priors 130 may include any suitable target impacts and/or target metrics.

In some embodiments, the initial state estimator 132 generates a causal state for one or more of the engagement opportunities included and/or represented by the state priors 130. In some embodiments, the initial state estimator 132 utilizes a stack model to estimate the initial state. The initial state may include an identification of whether a corresponding engagement opportunity is a binary engagement opportunity (e.g., an engagement opportunity having two potential outcomes) or a continuous engagement opportunity (e.g., an engagement opportunity having more than two potential outcomes and/or a changeable outcome). The initial state may additionally and/or alternatively represent a starting state for a user (e.g., enrolled or not enrolled in one or more programs, exposed or not exposed to one or more engagement opportunities). The initial state estimator 132 may generate the initial state in any suitable format, such as a state variable including one or more elements representative of one or more parameters of the initial state. The initial state may be provided as a normal and/or gamma distribution.

The initial state may be provided to a non-linear transformer 134 that determines a diminishing effect of the one or more engagement opportunities included in and/or represented by the initial state. For example, the non-linear transformer 134 may determine an optimal value of a Hill transformation for each individual engagement opportunity. The output of the non-linear transformer 134 includes a decay factor for repeated usage or exposure to the one or more engagement opportunities included in and/or represented by the initial state.

The state priors 130 and the decay factor generated by the non-linear transformer 134 may be provided to a Bayesian linear approximator 136 to generate a set of likelihood estimates for a set of potential next states. The Bayesian linear approximator 136 measures the time-varying coefficient of the one or more engagement opportunities of the initial state with respect to one or more target metrics by leveraging a Bayesian paradigm of steady space models and updated weights based on a likelihood estimation. The Bayesian linear approximator 136 may include a Bayesian steady state filter model. In some embodiments, the Bayesian linear approximator 136 may be represented by the equation:

$$y = \text{slope} + \sum_{m=1}^{M} \beta(m)\text{Hill}(x(m); k, s) + \sum_{c=1}^{c} \gamma(c)\mathbb{Z}(c) + \varepsilon$$

where $\beta$ is a coefficient of a corresponding engagement opportunity for the initial state by providing a prior as either a normal or gamma distribution; m refers to each of the engagement opportunities, M refers to the set of engagement opportunities, c represents one or more confounders for engagement, C is the set of confounders, y is a long-term metric of retention, y is a coefficient of confounder to estimate counterfactual when an engagement opportunity is omitted, slope is an indicator of seasonality, and E is unobserved attribution.

In some embodiments, the Hill transformation may be represented by the equation:

$$\text{Hill}(X; k, s) = \frac{1}{1 + (X/k)^{-s}} \text{ where } X \geq 0$$

where X is an individual engagement opportunity, k is half saturation, and s is a slope.

The output of the Bayesian linear approximator 136 is provided to a next state estimator 138 that predicts (or estimates) the next state of a corresponding system (e.g., enrollment system or process), engagement opportunity and/or a user. For example, in some embodiments, the predicted next state may be represented as:

$$[\text{Updated State}] = [\text{Previous State}] \times [\text{Maximum Likelihood Estimation}]$$

where Updated State is the predicted next state, Previous State is the prior state as represented by one or more state priors 130, and the Maximum Likelihood Estimation (e.g., a set of maximum likelihood estimates) is output by the Bayesian linear approximator 136. In some embodiments, the Maximum Likelihood Estimation is represented as:

$$P\left(\frac{y}{x}, \beta\right) = \prod \frac{e^{\sum \beta x}}{1 + e^{\sum \beta x}}$$

where y is the target metric being optimized for, x is the engagement opportunity, and $\beta$ is the impact (e.g., diminishing impact). In some embodiments, the Previous State (e.g., the state priors 130) may be represented as:

$$P(\beta) \sim N(\alpha, \sigma^2)$$

where $\alpha$ is a mean of the state priors 130 and $\sigma$ is the standard deviation. Substituting the prior two equations, the predicted next state may be represented as:

$$[\text{Updated State}] = N(\alpha, \sigma^2) \cdot \prod \frac{e^{\sum \beta x}}{1 + e^{\sum \beta x}}$$

In some embodiments, the denominator of the Maximum Likelihood estimation (e.g., $1+e^{\Sigma \beta x}$) is an intractable integral for the Posterior estimation, and a Markov Chain Monte Carlo Sampling simulation is applied to estimate the priors.

In some embodiments, the predicted next state represents an updated causal state that may be provided as a set of priors for a subsequent state estimation. Subsequent next state predictions may be iteratively generated based on received state priors 130 and/or a previously generated next state to estimate an $N^{th}$ state from the state priors 130, where N is an integer greater than zero. For each subsequently predicted next state, the state priors 130 may include the previously estimated next state and/or one or more additional state priors 130 corresponding to the prior state. In some embodiments, the Posterior estimation of a prior state (e.g., a first predicted next state) is provided as a state prior for prediction of a subsequent state (e.g., a second predicted next state).

In some embodiments, prior to determining a set of likelihood estimates for an initial state, a category of at least one engagement opportunity in the initial state is determined and a set of likelihood estimates is generated for the corresponding category. For example, in some embodiments, a category of an engagement opportunity may include one of a continuous category or a binary category. The set of likelihood estimates may be generated for the corresponding category, which requires less computation resources as determining the set of likelihood estimates for the initial state and the corresponding specific engagement opportunity. In some embodiments, after generating the set of likelihood estimates for the corresponding category, a determination is made whether the set of likelihood estimates for the category exceeds a predetermined threshold. In some embodiments, when the set of likelihood estimates for the category do not exceed the predetermined threshold (e.g., are less than or are less than or equal to the predetermined threshold), the set of likelihood estimates is not generated for the specific engagement opportunity. Alternatively, when the set of likelihood estimates for the category exceeds the predetermined threshold (e.g., are greater than or are greater than or equal to the predetermined threshold), the set of likelihood estimates for the specific engagement opportunity are generated.

The $N^{th}$ predicted next state may be provided to an action selector 142 that selects a next action 144 based on the $N^{th}$ predicted next state. For example, in some embodiments, the action selector 142 selects an interface element or component to be included in a user interface to be presented to a user based on the $N^{th}$ predicted next state. The interface element or component may be selected such that the probability of the $N^{th}$ predicted next state occurring is increased or decreased. For example, where the $N^{th}$ predicted next state estimates a change in enrollment status in an enrollment program, the selected interface component may be selected such that inclusion of the interface component in a user interface may increase or decrease the likelihood of the user's enrollment status in the enrollment program occurring at the $N^{th}$ predicted next state.

As another example, in some embodiments, the action selector 142 selects a next action 144 that includes an analysis action that generates an analysis output for the target metric based on the $N^{th}$ predicted next state. The analysis output may include a transformation of the $N^{th}$ predicted next state into one or more interpretable metrics. The interpretable metrics may be utilized to determine impacts of one or more of the engagement opportunities on one or more of the target metrics.

In some embodiments, the next state predictor 120 may predict a next state of an enrollment program based on one or more engagement opportunities and an initial state of the enrollment program and/or a user of the enrollment program. For example, in some embodiments, user historical information and one or more target metrics (e.g., retention, utilization) may be provided as state priors 130. The next state predictor 120 predicts a likely next state of the user for the enrollment program (e.g., enrolled, unenrolled, retained) based on the use of one or more engagement opportunities. Based on the predicted next state (or states) of the user, the action selector 142 may select one or more next actions 144 that are likely to result in a user having a desired state (e.g., enrolled, retained) for the corresponding enrollment program. Although certain embodiments are discussed herein, it will be appreciated that the next state predictor 120 may be utilized to predict states of any suitable system, process, or user interface.

Figure 2:
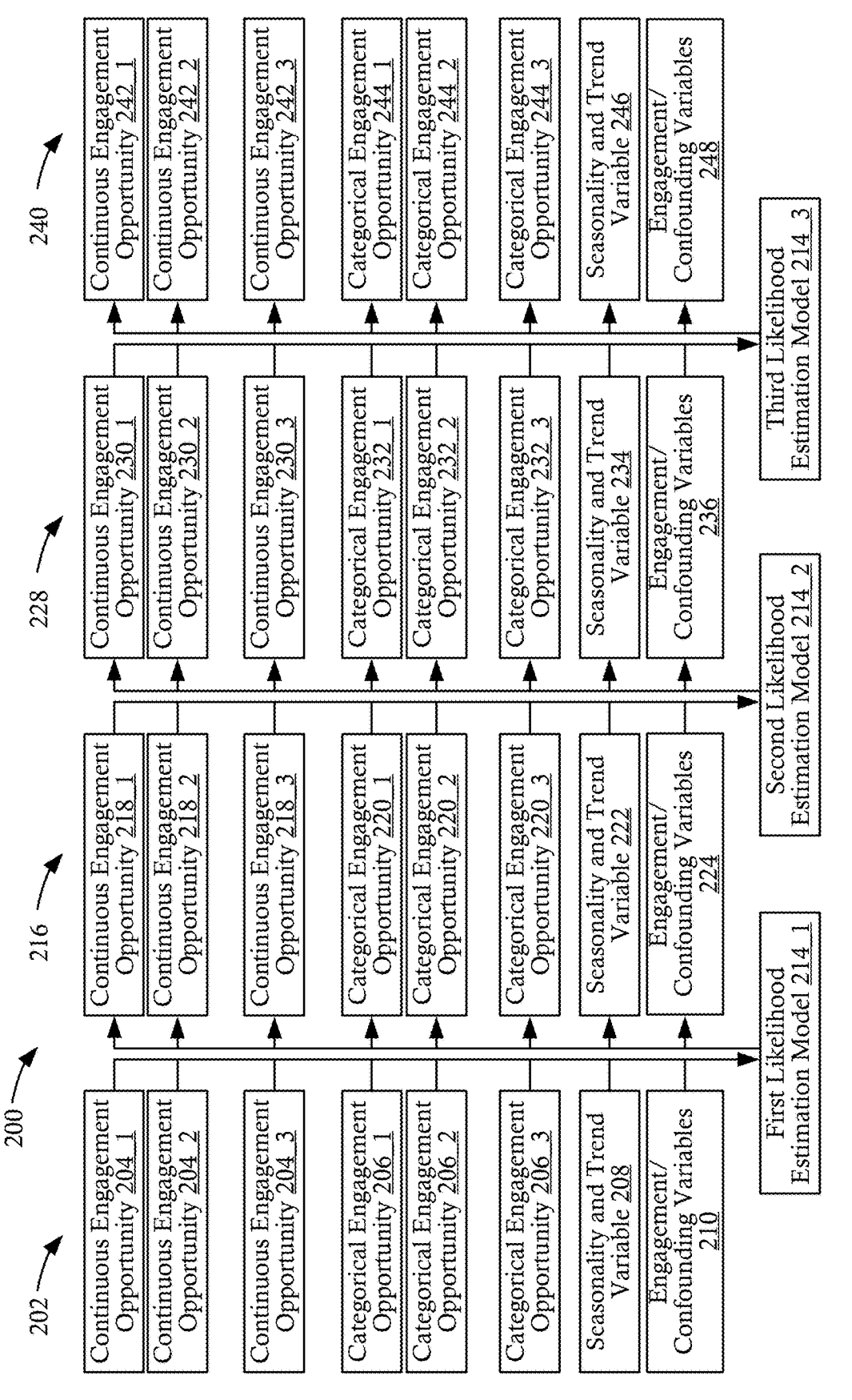
FIG. 2 depicts an example system for iterative state prediction, in accordance with some embodiments.

FIG. 2 depicts an example system 200 for iterative state prediction, in accordance with some embodiments. The system 200 is implemented by a computing system, such as the next state prediction computing device 102 illustrated in FIG. 1. One or more components of the system 200 may be implemented as part of the next state predictor 120 and/or implemented separately by one or more processing resources, such as the processing resource 104 of the next state prediction computing device 102.

As illustrated in FIG. 2, an initial state 202 is represented at time t=0. The initial state 202 includes one or more sets of engagement opportunities, such as one or more continuous engagement opportunities 204_1 to 204_3 (collectively, "continuous engagement opportunities 204") and/or one or more categorical (e.g., binary) engagement opportunities 206_1 to 206_3 (collectively, "categorical engagement opportunities 206"). In some embodiments, the initial state 202 includes additional state variables, such as a seasonality and trend variable 208 or engagement/confounding variables 210. In some embodiments, an engagement variable includes one or more target metrics for maximization for next state estimation and a confounding variable includes one or more factors that may impact a result of a study by distorting a relationship between exposure and outcome. As discussed above, an initial state estimation may be generated for the initial state 202, for example, by an initial state estimator, such as initial state estimator 132 illustrated in FIG. 1.

One or more parameters or portions of the initial state 202 may be provided to a first likelihood estimation model 214_1 that generates a first set of likelihood estimations for one or more target metrics, such as one or more target metrics included in the engagement/confounding variables 210. The first set of likelihood estimations includes a probability distribution for potential next states based on the initial state 202. The first set of likelihood estimations and one or more elements of the initial state 202 are provided to a next state estimator that generates a first predicted state 216 for a time t=1.

In some embodiments, the first predicted state 216 is similar to the initial state 202 and includes one or more continuous engagement opportunities 218_1 to 218_3 (collectively, "continuous engagement opportunities 218") and/or one or more categorical engagement opportunities 220_1 to 220_3 (collectively, "categorical engagement opportunities 220"). In some embodiments, the continuous engagement opportunities 218 and/or the categorical engagement opportunities 220 of the first predicted state 216 are the same continuous engagement opportunities 204 and/or categorical engagement opportunities 206 included in the initial state 202. In some embodiments, one or more of the continuous engagement opportunities 218 and/or the categorical engagement opportunities 220 of the first predicted state 216 are different and/or updated engagement opportunities as compared to the continuous engagement opportunities 204 and/or categorical engagement opportunities 206 included in the initial state 202. Similarly, the first predicted state 216 may include one or more state variables, such as a seasonality and trend variable 222 or engagement/confounding variables 224 that are the same as, similar to, and/or different from variables 208, 210 of the initial state 202.

In some embodiments, a first predicted state 216 is generated, for example, by a stack model, and provided as an input to a second likelihood estimation model 214_2 that generates a second set of likelihood estimations for one or more target metrics, such as one or more target metrics included in the engagement/confounding variables 224. The second likelihood estimation model 214_2 is similar to the first likelihood estimation model 214_1. In some embodiments, the first likelihood estimation model 214_1 and the second likelihood estimation model 214_2 are the same model. The second set of likelihood estimations includes a probability distribution for potential next states based on the first predicted state 216. The second set of likelihood estimations and one or more elements of the first predicted state 216 are provided to a next state estimator that generates a second predicted state 228 for a time t=2.

In some embodiments, the second predicted state 228 is similar to each of the initial state 202 and the first predicted state 216. The second predicted state 228 includes one or more continuous engagement opportunities 230_1 to 230_3 (collectively, "continuous engagement opportunities 230") and/or one or more categorical engagement opportunities 232_1 to 232_3 (collectively, "categorical engagement opportunities 232"). In some embodiments, the continuous engagement opportunities 230 and/or the categorical engagement opportunities 232 of the second predicted state 228 are the same continuous engagement opportunities 204, 218 and/or categorical engagement opportunities 206, 220 included in at least one of the initial state 202 or the first predicted state 216. In some embodiments, one or more of the continuous engagement opportunities 230 and/or the categorical engagement opportunities 232 of the second predicted state 228 are different and/or updated engagement opportunities as compared to the continuous engagement opportunities 204, 218 and/or categorical engagement opportunities 206, 220 included in each of the initial state 202 and/or the first predicted state 216. Similarly, the second predicted state 228 may include one or more state variables, such as a seasonality and trend variable 234 or engagement/confounding variables 236 that is the same as, similar to, and/or different from variables 208, 210, 222, 224 of one or more of the initial state 202 and/or the first predicted state 216.

In some embodiments, a second predicted state 228 is generated, for example, by a stack model, and provided as an input to a third likelihood estimation model 214_3 that generates a third set of likelihood estimations for one or more target metrics, such as one or more target metrics included in the engagement/confounding variables 224. The third likelihood estimation model 214_3 is similar to each of the first likelihood estimation model 214_1 and the second likelihood estimation model 214_2. In some embodiments, the third likelihood estimation model 214_3 may be the same as one or more of the first likelihood estimation model 214_1 and/or the second likelihood estimation model 214_2.

The third set of likelihood estimations includes a probability distribution for potential next states based on the second predicted state 228. The third set of likelihood estimations and one or more elements of the second predicted state 228 are provided to a next state estimator that generates a third predicted state 240 for a time t=3.

In some embodiments, the third predicted state 240 is similar to each of the initial state 202, the first predicted state 216, and/or the second predicted state 228. The third predicted state 240 includes one or more continuous engagement opportunities 242_1 to 242_3 (collectively, "continuous engagement opportunities 242") and/or one or more categorical engagement opportunities 244_1 to 244_3 (collectively, "categorical engagement opportunities 244"). In some embodiments, the continuous engagement opportunities 242 and/or the categorical engagement opportunities 244 of the third predicted state 240 are the same continuous engagement opportunities 204, 218, 230 and/or categorical engagement opportunities 206, 220, 232 included in at least one of the initial state 202, the first predicted state 216, or the second predicted state 228. In some embodiments, one or more of the continuous engagement opportunities 242 and/or the categorical engagement opportunities 244 of the third predicted state 240 are different and/or updated engagement opportunities as compared to the continuous engagement opportunities 204, 218, 230 and/or categorical engagement opportunities 206, 220, 232 included in each of the initial state 202, the first predicted state 216, and/or the second predicted state 228. Similarly, the third predicted state 240 may include one or more state variables, such as a seasonality and trend variable 246 or engagement/confounding variables 248 that is the same as, similar to, and/or different from variables 208, 210, 222, 224, 234, 236 of one or more of the initial state 202, the first predicted state 216, and/or the second predicted state 228.

In some embodiments, a third predicted state 240 is generated, for example, by a stack model. Although not illustrated in FIG. 2, it will be understood that the third predicted state 240 may be provided to a fourth likelihood estimation model to generate a fourth predicted state. Similarly, the additionally predicted states may be iteratively provided to subsequent likelihood estimation models to generate a state prediction for an $N^{th}$ state at a time t=N, where N is an integer greater than zero.

In some embodiments, one or more of the state estimations 202, 216, 228, 240 may be provided as an output to one or more additional processes, such as an action selector for selecting one or more additional actions based on one or more of the state estimations 202, 216, 228, 240. For example, in some embodiments, a third predicted state 240 may be provided to an action selector that uses the third predicted state 240 to select a next action for presentation via an interface, such as, for example, an interface element or component. As another example, in some embodiments, one or more of the state estimations 202, 216, 228, 240 may be provided to an action selector that utilizes each of the state estimations 202, 216, 228, 240 to generate an analysis output representative of the impact of one or more engagement opportunities on one or more target metrics.

Figure 3:
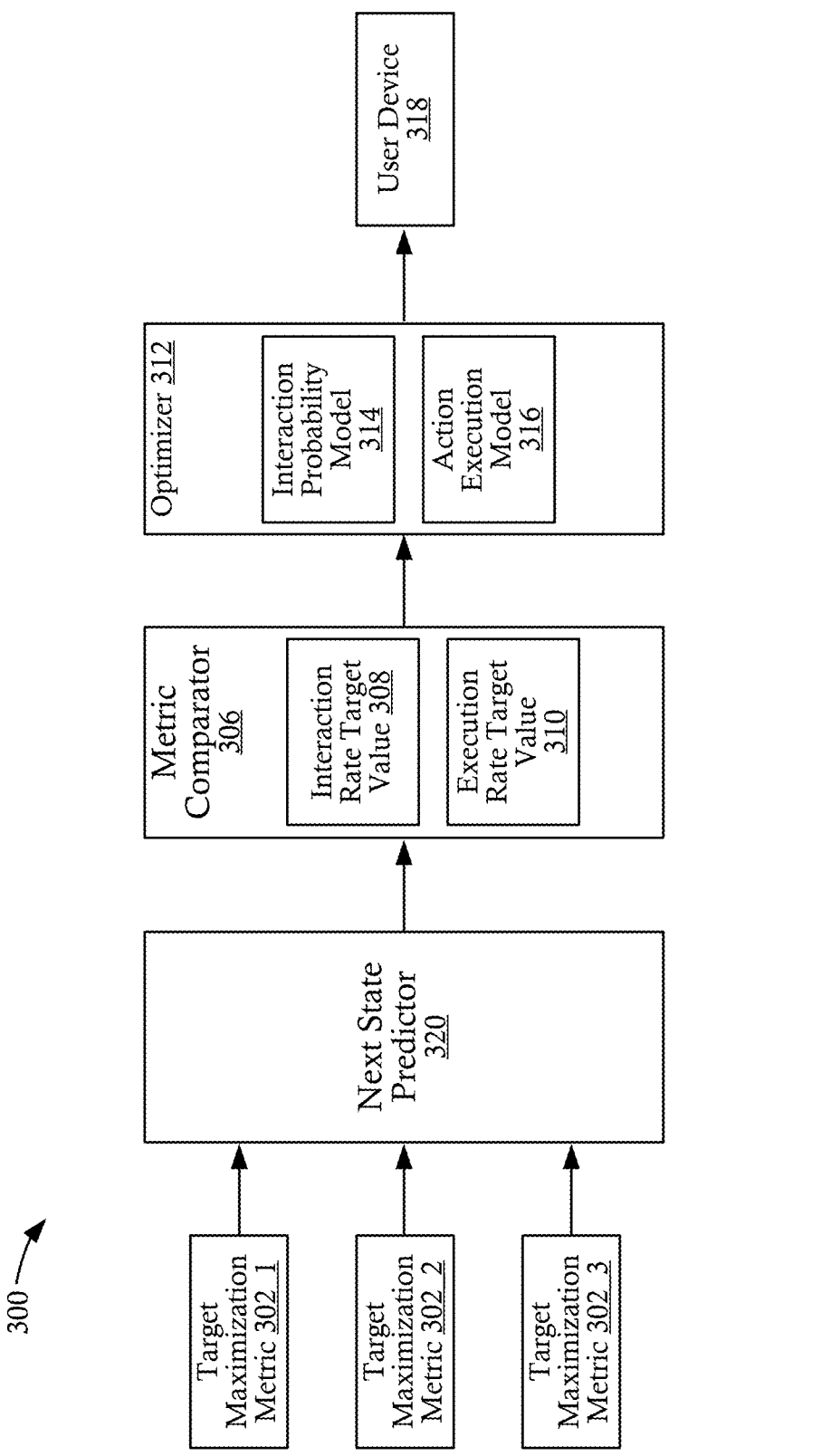
FIG. 3 depicts an example system for next action generation using next state predictions, in accordance with some embodiments.

FIG. 3 depicts an example system 300 for next action generation using next state predictions, in accordance with some embodiments. The system 300 is implemented by a computing system, such as the next state prediction computing device 102 illustrated in FIG. 1. One or more components of the system 300 may be implemented as part of the next state predictor 120 and/or implemented separately by one or more processing resources, such as the processing resource 104 of the next state prediction computing device 102.

In some embodiments, one or more target maximization metrics 302_1 to 302_3 (collectively, "maximization metrics 302") are received by a next state predictor 320. The next state predictor 320 is similar to the next state predictor 120 discussed above with respect to FIG. 1. The next state predictor 320 outputs a predicted next state. For example, the next state predictor 320 may output one or more state variables representative of a predicted next state, one or more metrics of the predicted next state, and/or any other suitable next state data.

In some embodiments, the output of the next state predictor 320 is provided to a metric comparator 306 that compares one or more variables of the predicted next state to one or more target metric values (such as an interaction rate target value 308, a conversion rate target value 310, etc.) for a period corresponding to the predicted next state. The target metric values may include, for example, target values for each of the maximization metrics 302 for one or more future periods. Additionally and/or alternatively, the target metric values may include one or more values for metrics impacted by and/or determined by one or more of the maximization metrics 302.

In some embodiments, the next state prediction output of the next state predictor 320 and/or the output of the metric comparator 306 are provided to an optimizer 312 that optimizes one or more future actions in order to meet and/or adjust one or more of the target metric values. For example, in some embodiments, the optimizer 312 includes an interaction probability model 314 and/or an action execution model 316. The interaction probability model 314 may select one or more interface elements or interface components based on a probability of a user interacting with the selected interface elements or components based on the predicted next state and/or the target metric values 308, 310. The action execution model 316 may select one or more next actions for execution and/or presentation to a user via a user device 318 based on the probability of a user executing the selected next action after interacting with an interface element and/or being presented an interface element related to the action. Although specific embodiments are discussed herein, it will be appreciated that any suitable optimization process and/or mechanism may be implemented.

Figure 4:
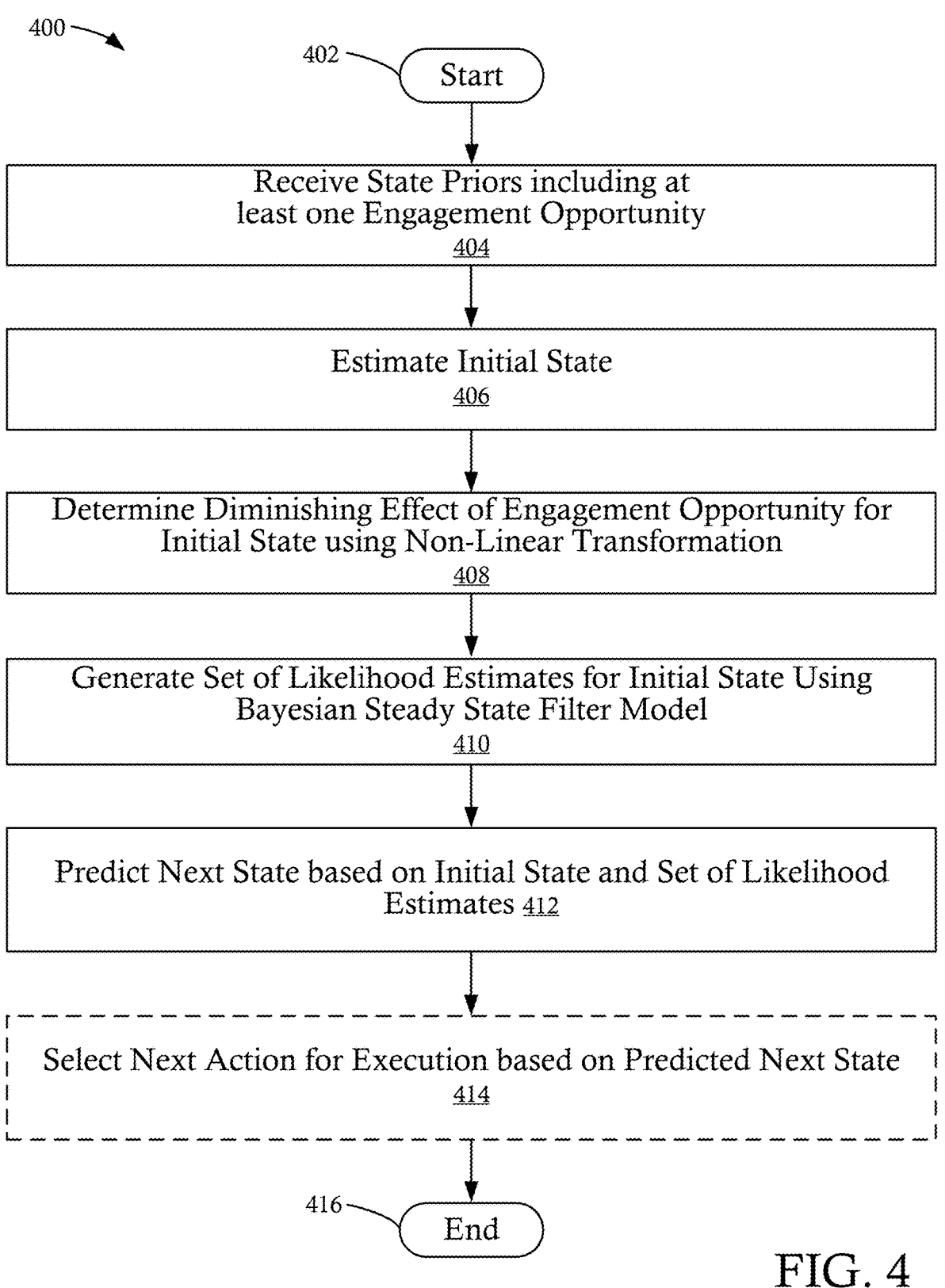
FIG. 4 depicts a flow diagram illustrating a method of next state prediction, in accordance with some embodiments.
Figure 5:
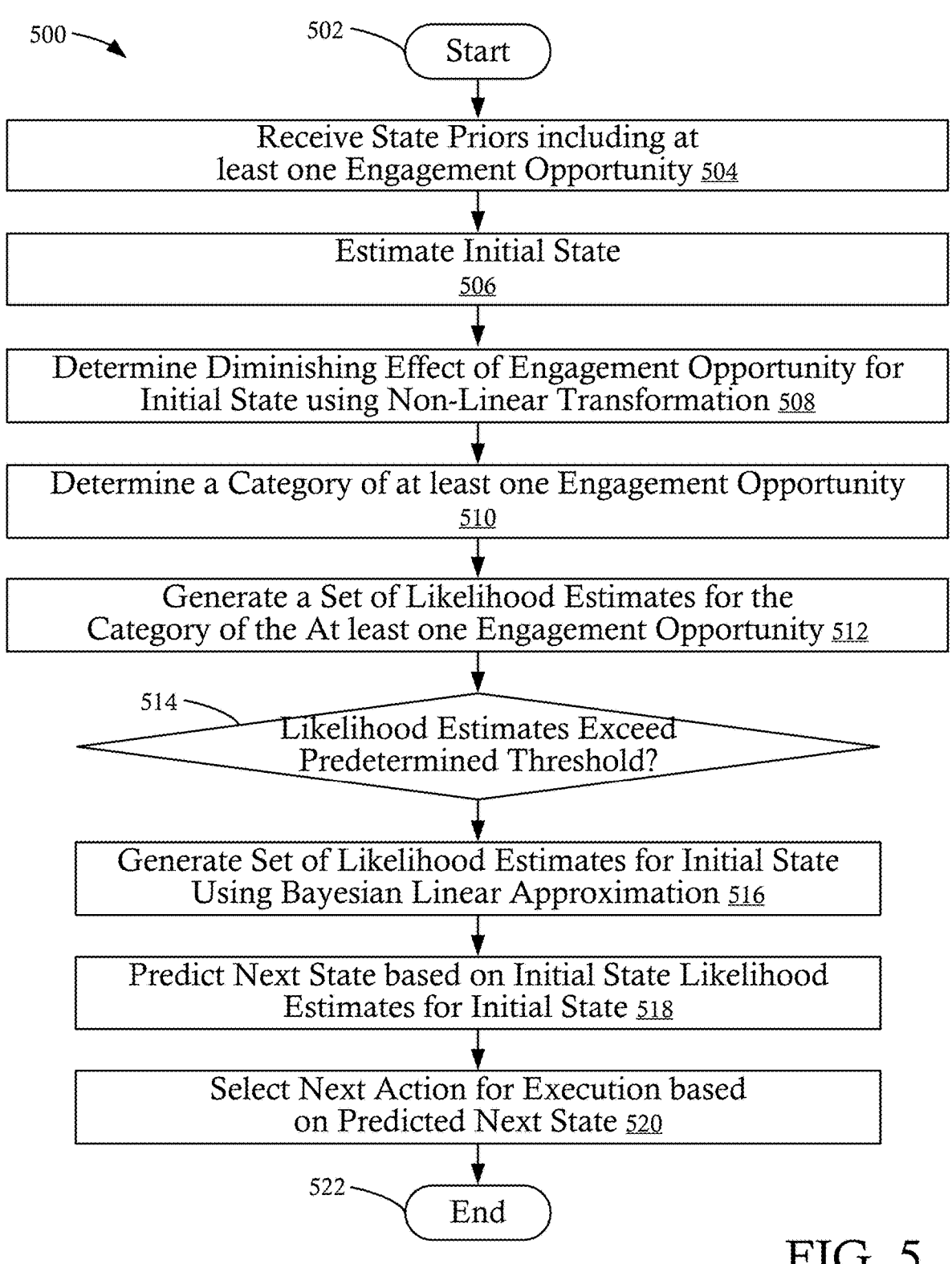
FIG. 5 depicts a flow diagram illustrating a method of next state prediction based on a category, in accordance with some embodiments.

FIGS. 4 and 5 are flow diagrams depicting various example methods. In some embodiments, one or more blocks of the methods may be executed substantially concurrently and/or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 4 and 5 may be implemented in the form of executable instructions stored on a machine-readable medium and executed by a processing resource and/or in the form of electronic circuitry. For example, aspects of the methods may be described below as being performed by a next action prediction process, an example of which may be the next state predictor 120 running on a hardware processing resource 104 of the next state prediction computing device 102 described above. Additionally, other aspects of the methods described below may be described with reference to other elements shown in FIG. 1 for non-limiting illustration purposes.

FIG. 4 depicts a flow diagram illustrating a method 400 of next state prediction, in accordance with some embodiments. Method 400 starts at block 402 and continues to block 404, where a set of state priors including at least one engagement opportunity is received. The set of state priors may include elements such as an enrollment status in one or more programs or processes, engagement elements or opportunities that were presented to a user and/or may have been presented to a user during a prior state, historical interaction data, and/or any other suitable data. In some embodiments, the set of state priors includes one or more target metrics for maximization.

At block 406, an initial state is estimated based on the received set of state priors. The initial state may be estimated by a stack model and may include one or more initial state variables, such as one or more engagement opportunities, one or more state variables, and/or any other suitable state data. In some embodiments, the initial state includes a causal state for one or more of the engagement opportunities included in and/or represented by the set of state priors. In some embodiments, a stack model is implemented to estimate the initial state. The initial state may include an identification of whether a corresponding engagement opportunity is a binary engagement opportunity or a continuous engagement opportunity.

At block 408, the diminishing effect (or impact) of the one or more engagement opportunities included in the initial state are determined. In some embodiments, the diminishing impact is determined using a non-linear transformation. The non-linear transformation may determine an optimal value of a Hill transformation for each individual engagement opportunity. The output of the non-linear transformation includes a decay factor for repeated usage or exposure to the one or more engagement opportunities included in and/or represented by the initial state.

At block 410, a set of likelihood estimates for the initial state are generated using a Bayesian linear approximation (e.g., a Bayesian steady state filter model). In some embodiments, the Bayesian linear approximation measures the time-varying coefficient of the one or more engagement opportunities of the initial state with respect to one or more target metrics by leveraging a Bayesian paradigm of steady space models and updated weights based on the likelihood estimation.

At block 412, a next state is predicted based on the initial state and the set of likelihood estimates. In some embodiments, the predicted next state represents an updated causal state that may be provided as a set of priors for a subsequent state estimation. Subsequent next state predictions may be iteratively generated based on received state priors and/or a previously generated next state to estimate an $N^{th}$ state from the initial state, where N is an integer greater than zero. For each subsequently predicted next state, the set of state priors may include the previously estimated next state and/or one or more additional state priors corresponding to the prior state.

At block 414, a next action is selected for execution based on the predicted next state. In some embodiments, a next action may include selection of an interface element or component to be included in a user interface to be presented to a user based on the $N^{th}$ predicted next state. As another example, in some embodiments, a next action may include an analysis action that generates an analysis output for a target metric based on the $N^{th}$ predicted next state. The analysis output may include a transformation of the $N^{th}$ predicted next state into one or more interpretable metrics. The interpretable metrics may be utilized to determine impacts of one or more of the engagement opportunities on one or more of the target metrics. After selecting a next action, the method 400 proceeds to block 416, and the method 400 ends.

FIG. 5 depicts a flow diagram illustrating a method 500 of next state prediction based on a category, in accordance with some embodiments. Method 500 starts at block 502 and continues to block 504, where a set of state priors including at least one engagement opportunity is received. The set of state priors may include elements such as an enrollment status in one or more programs or processes, engagement elements or opportunities that were presented to a user and/or may have been presented to a user during a prior state, historical interaction data, and/or any other suitable data. In some embodiments, the set of state priors includes one or more target metrics for maximization.

At block 506, an initial state is estimated based on the received set of state priors. The initial state may be estimated by a stack model and may include one or more initial state variables, such as one or more engagement opportunities, one or more state variables, and/or any other suitable state data. In some embodiments, the initial state includes a causal state for one or more of the engagement opportunities included and/or represented by the set of state priors. In some embodiments, a stack model is implemented to estimate the initial state.

At block 508, the diminishing effect (or impact) of the one or more engagement opportunities included in the initial state is determined. In some embodiments, the diminishing impact is determined using a non-linear transformation. The non-linear transformation may determine an optimal value of a Hill transformation for each individual engagement opportunity. The output of the non-linear transformation includes a decay factor for repeated usage or exposure to the one or more engagement opportunities included in and/or represented by the initial state.

At block 510, a category of at least one of the engagement opportunities included in the initial state is determined. A category may include a determination whether the corresponding engagement opportunity is a binary engagement opportunity or a continuous engagement opportunity.

At block 512, a set of likelihood estimates are generated for the category of the at least one engagement opportunity. For example, when the category of a corresponding engagement opportunity is a binary engagement opportunity, a set of likelihood estimates for binary engagements may be generated. Similarly, when the category of the corresponding engagement opportunity is a continuous engagement opportunity, a set of likelihood estimates for continuous engagements may be generated. The set of likelihood estimates for the corresponding category may be generated based on the initial state. The set of likelihood estimates for the corresponding category may be generated by a first Bayesian linear approximation (e.g., a first Bayesian steady state filter model).

At block 514, a determination is made whether the set of likelihood estimates for the corresponding category exceeds a predetermined threshold. For example, in some embodiments, a set of likelihood estimates may include a low likelihood of impact for the corresponding category of the engagement opportunity such that a desired next state transition is unlikely to occur or be predicted. In such instances, the method 500 may proceed directly to block 522 and end. Alternatively, when a set of likelihood estimates includes a likelihood of impact for the corresponding category above (or, in some embodiments, equal to or above) a predetermined threshold, a desired next state transition may be likely or possible, and the method 500 proceeds to block 516 to perform state-specific predictions.

At block 516, a set of likelihood estimates for the initial state are generated using a second Bayesian linear approximation (e.g., a Bayesian steady state filter model). In some embodiments, the Bayesian linear approximation measures the time-varying coefficient of the one or more engagement opportunities of the initial state with respect to one or more target metrics by leveraging a Bayesian paradigm of steady space models and updated weights based on the likelihood estimation. The first Bayesian linear approximation and the second Bayesian linear approximation may be performed by the same linear approximation model or may be generated by different linear approximation models.

At block 518, a next state is predicted based on the initial state and the set of likelihood estimates. In some embodiments, the predicted next state represents an updated causal state that may be provided as a set of priors for a subsequent state estimation. Subsequent next state predictions may be iteratively generated based on received state priors and/or a previously generated next state to estimate an $N^{th}$ state from the initial state, where N is an integer greater than zero. For each subsequently predicted next state, the set of state priors may include the previously estimated next state and/or one or more additional state priors corresponding to the prior state.

At block 520, a next action is selected for execution based on the predicted next state. In some embodiments, a next action may include selection of an interface element or component to be included in a user interface to be presented to a user based on the $N^{th}$ predicted next state. As another example, in some embodiments, a next action may include an analysis action that generates an analysis output for a target metric based on the $N^{th}$ predicted next state. The analysis output may include a transformation of the $N^{th}$ predicted next state into one or more interpretable metrics. The interpretable metrics may be utilized to determine impacts of one or more of the engagement opportunities on one or more of the target metrics. After selecting a next action, the method 500 proceeds to block 522, and the method 500 ends.

FIGS. 6 and 7 depict example systems 600, 700, respectively, that include non-transitory, machine-readable medium 604, 704, respectively, encoded with example instructions executable by processing resources 602, 702, respectively. In some implementations, the systems 600, 700 may be useful for implementing aspects of the next state predictor 120 of FIG. 1, the systems 200, 300 of FIGS. 2 and/or 3, or for performing aspects of methods 400 or 500 of FIGS. 4 and 5, respectively. For example, the instructions encoded on machine-readable medium 604, 704 may be included in instructions 108 of FIG. 1. In some implementations, functionality described with respect to FIG. 1 may be included in the instructions encoded on machine-readable medium 604, 704.

The processing resources 602, 702 may include a microcontroller, a microprocessor, central processing unit core(s), an ASIC, an FPGA, and/or other hardware device suitable for retrieval and/or execution of instructions from the machine-readable medium 604, 704 to perform functions related to various examples. Additionally or alternatively, the processing resources 602, 702 may include or be coupled to electronic circuitry or dedicated logic for performing some or all of the functionality of the instructions described herein.

The machine-readable medium 604, 704 may be any medium suitable for storing executable instructions, such as RAM, ROM, EEPROM, flash memory, a hard disk drive, an optical disc, or the like. In some example implementations, the machine-readable medium 604, 704 may be a tangible, non-transitory medium. The machine-readable medium 604, 704 may be disposed within the systems 600, 700, respectively, in which case the executable instructions may be deemed installed or embedded on the system. Alternatively, the machine-readable medium 604, 704 may be a portable (e.g., external) storage medium, and may be part of an installation package.

As described further herein, the machine-readable medium 604, 704 may be encoded with a set of executable instructions. It should be understood that part or all of the executable instructions and/or electronic circuits included within one box may, in alternate implementations, be included in a different box shown in the figures or in a different box not shown. Some implementations may include more or fewer instructions than are shown in FIGS. 6 and 7.

With reference to FIG. 6, the machine-readable medium 604 includes instructions 606-616. Instructions 606, when executed, cause the processing resource 602 to receive state priors including at least one engagement opportunity. The set of state priors may include elements such as an enrollment status in one or more programs or processes, engagement elements or opportunities that were presented to a user and/or may have been presented to a user during a prior state, historical interaction data, and/or any other suitable data. In some embodiments, the set of state priors includes one or more target metrics for maximization.

Instructions 608, when executed, cause the processing resource 602 to estimate an initial state based on the state priors. The initial state may be estimated by a stack model and may include one or more initial state variables, such as one or more engagement opportunities, one or more state variables, and/or any other suitable state data. In some embodiments, the initial state includes a causal state for one or more of the engagement opportunities included and/or represented by the set of state priors. In some embodiments, a stack model is implemented to estimate the initial state.

Instructions 610, when executed, cause the processing resource 602 to determine a diminishing effect of an engagement opportunity for the initial state using a non-linear transformation. The non-linear transformation may determine an optimal value of a Hill transformation for each individual engagement opportunity. The output of the non-linear transformation includes a decay factor for repeated usage or exposure to the one or more engagement opportunities included in and/or represented by the initial state.

Instructions 612, when executed, cause the processing resource 602 to generate a set of likelihood estimates for the initial state using a Bayesian linear approximation (e.g., a Bayesian steady state filter model). In some embodiments, the Bayesian linear approximation measures the timevarying coefficient of the one or more engagement opportunities of the initial state with respect to one or more target metrics by leveraging a Bayesian paradigm of steady space models and updated weights based on the likelihood estimation.

Instructions 614, when executed, cause the processing resource 602 to predict a next state based on the initial state and the set of likelihood estimates. In some embodiments, the predicted next state represents an updated causal state that may be provided as a set of priors for a subsequent state estimation. Subsequent next state predictions may be iteratively generated based on received state priors and/or a previously generated next state to estimate an $N^{th}$ state from the initial state, where N is an integer greater than zero. For each subsequently predicted next state, the set of state priors may include the previously estimated next state and/or one or more additional state priors corresponding to the prior state.

Instructions 616, when executed, cause the processing resource 602 to select a next action for execution based on the predicted next state. In some embodiments, a next action may include selection of an interface element or component to be included in a user interface to be presented to a user based on the $N^{th}$ predicted next state. As another example, in some embodiments, a next action may include an analysis action that generates an analysis output for a target metric based on the $N^{th}$ predicted next state. The analysis output may include a transformation of the $N^{th}$ predicted next state into one or more interpretable metrics. The interpretable metrics may be utilized to determine impacts of one or more of the engagement opportunities on one or more of the target metrics.

With reference to FIG. 7, the machine-readable medium 704 includes instructions 706-720. Instructions 706, when executed, cause the processing resource 702 to receive state priors including at least one engagement opportunity. The set of state priors may include elements such as an enrollment status in one or more programs or processes, engagement elements or opportunities that were presented to a user and/or may have been presented to a user during a prior state, historical interaction data, and/or any other suitable data. In some embodiments, the set of state priors includes one or more target metrics for maximization.

Instructions 708, when executed, cause the processing resource 702 to estimate an initial state based on the state priors. The initial state may be estimated by a stack model and may include one or more initial state variables, such as one or more engagement opportunities, one or more state variables, and/or any other suitable state data. In some embodiments, the initial state includes a causal state for one or more of the engagement opportunities included and/or represented by the set of state priors. In some embodiments, a stack model is implemented to estimate the initial state.

Instructions 710, when executed, cause the processing resource 702 to determine a diminishing effect of an engagement opportunity for the initial state using a non-linear transformation. The non-linear transformation may determine an optimal value of a Hill transformation for each individual engagement opportunity. The output of the non-linear transformation includes a decay factor for repeated usage or exposure to the one or more engagement opportunities included in and/or represented by the initial state.

Instructions 712, when executed, cause the processing resource 702 to determine a category of at least one of the engagement opportunities included in the initial state. A category may include a determination of whether the corresponding engagement opportunity is a binary engagement opportunity or a continuous engagement opportunity.

Instructions 714, when executed, cause the processing resource 702 to generate a set of likelihood estimates for the category of the at least one engagement opportunity. For example, when the category of a corresponding engagement opportunity is a binary engagement opportunity, a set of likelihood estimates for binary engagements may be generated. Similarly, when the category of the corresponding engagement opportunity is a continuous engagement opportunity, a set of likelihood estimates for continuous engagements may be generated. The set of likelihood estimates for the corresponding category may be generated based on the initial state. The set of likelihood estimates for the corresponding category may be generated by a first Bayesian linear approximation (e.g., a first Bayesian steady state filter model).

Instructions 716, when executed, cause the processing resource 702 to determine whether the set of likelihood estimates for the corresponding category exceed a predetermined threshold. For example, in some embodiments, a set of likelihood estimates may include a low likelihood of impact for the corresponding category of the engagement opportunity such that a desired next state transition is unlikely to occur or be predicted. Alternatively, when a set of likelihood estimates includes a likelihood of impact for the corresponding category above (or, in some embodiments, equal to or above) a predetermined threshold, a desired next state transition may be likely or possible.

Instructions 718, when executed responsive to a determination that the set of likelihood estimates for the corresponding category exceed the predetermined threshold, cause the processing resource 702 to generate a set of likelihood estimates for the initial state using a Bayesian linear approximation (e.g., a Bayesian steady state filter model). In some embodiments, the Bayesian linear approximation measures the time-varying coefficient of the one or more engagement opportunities of the initial state with respect to one or more target metrics by leveraging a Bayesian paradigm of steady space models and updated weights based on the likelihood estimation.

Instructions 720, when executed, cause the processing resource 702 to predict a next state based on the initial state and the set of likelihood estimates. In some embodiments, the predicted next state represents an updated causal state that may be provided as a set of priors for a subsequent state estimation. Subsequent next state predictions may be iteratively generated based on received state priors and/or a previously generated next state to estimate an $N^{th}$ state from the initial state, where N is an integer greater than zero. For each subsequently predicted next state, the set of state priors may include the previously estimated next state and/or one or more additional state priors corresponding to the prior state.

Instructions 722, when executed, cause the processing resource 702 to select a next action for execution based on the predicted next state. In some embodiments, a next action may include selection of an interface element or component to be included in a user interface to be presented to a user based on the $N^{th}$ predicted next state. As another example, in some embodiments, a next action may include an analysis action that generates an analysis output for a target metric based on the $N^{th}$ predicted next state. The analysis output may include a transformation of the $N^{th}$ predicted next state into one or more interpretable metrics. The interpretable metrics may be utilized to determine impacts of one or more of the engagement opportunities on one or more of the target metrics.

Figure 8:
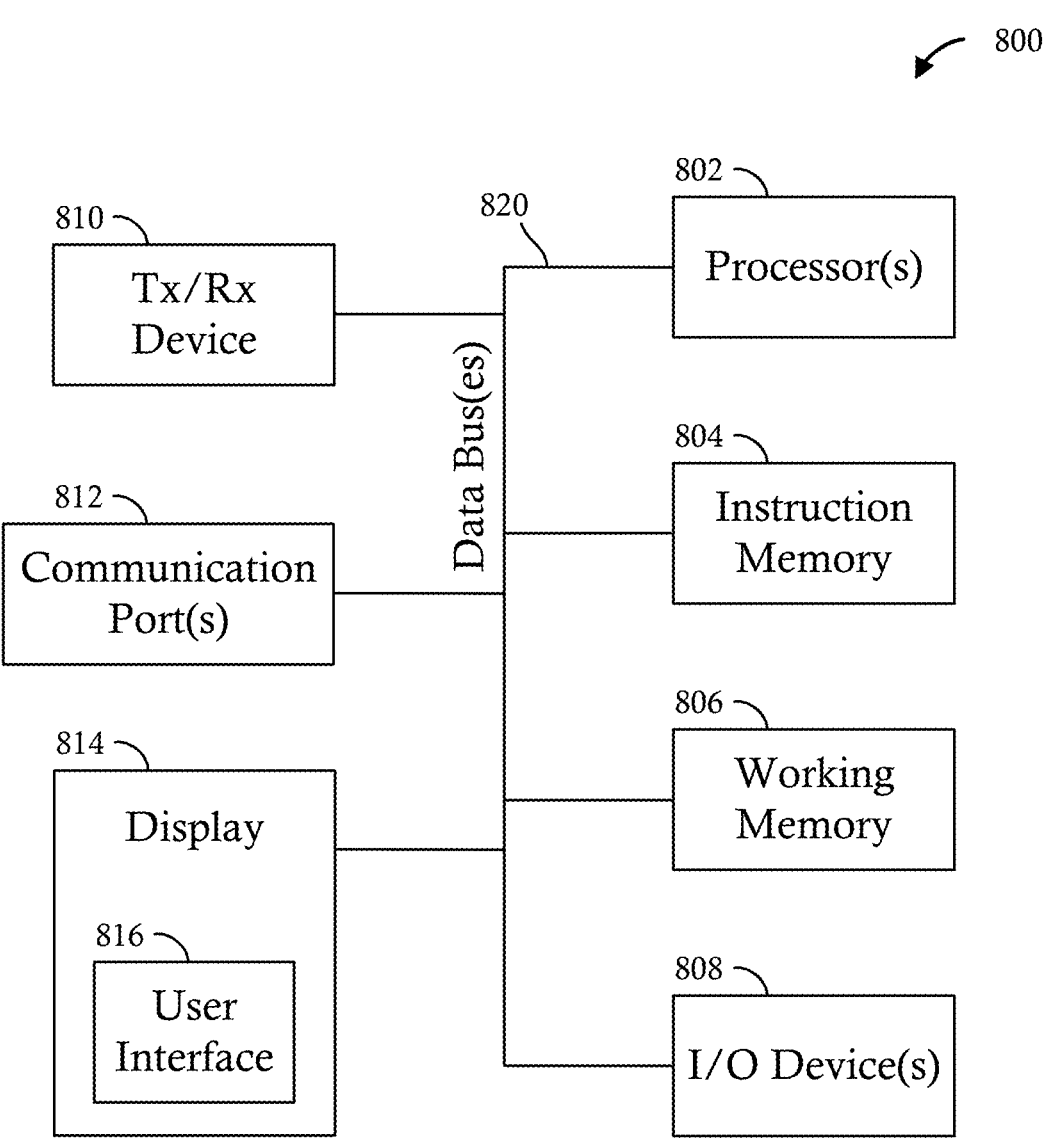
FIG. 8 depicts an example computer system that implements one or more of the disclosed processes, in accordance with some embodiments.

FIG. 8 illustrates a block diagram of a computing device 800, in accordance with some embodiments. Although FIG. 8 is described with respect to certain components shown therein, it will be appreciated that the elements of the computing device 800 may be combined, omitted, and/or replicated. In addition, it will be appreciated that additional elements other than those illustrated in FIG. 8 may be added to the computing device.

As shown in FIG. 8, the computing device 800 may include one or more processing resources 802, instruction memory 804, working memory 806, input/output devices 808, transceiver 810, communication ports 812, display 814, and/or any other suitable elements each operatively coupled to one or more data buses 820. The data buses 820 allow for communication among the various components. The data buses 820 may include wired, or wireless, communication channels.

The one or more processing resources 802 may include any processing circuitry operable to control operations of the computing device 800. In some embodiments, the one or more processing resources 802 include one or more distinct processors, each having one or more cores (e.g., processing circuits). Each of the distinct processors may have the same or different structure. The one or more processing resources 802 may include one or more central processing units (CPUs), one or more graphics processing units (GPUs), application-specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processing resources 802 may also be implemented by a controller, a microcontroller, an application-specific integrated circuit (ASIC), a field-programmable gate array (FPGA), a programmable logic device (PLD), etc.

In some embodiments, the one or more processing resources 802 implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 804 may store instructions that are accessed (e.g., read) and executed by at least one of the one or more processing resources 802. For example, the instruction memory 804 may be a non-transitory, computer-readable storage medium such as a read-only memory (ROM), an electrically erasable programmable read-only memory (EEPROM), flash memory (e.g., NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processing resources 802 may perform a certain function or operation by executing code, stored on the instruction memory 804, embodying the function or operation. For example, the one or more processing resources 802 may execute code stored in the instruction memory 804 to perform one or more of any function, method, or operation disclosed herein.

Additionally, the one or more processing resources 802 may store data to, and read data from, the working memory 806. For example, the one or more processing resources 802 may store a working set of instructions to the working memory 806, such as instructions loaded from the instruction memory 804. The one or more processing resources 802 may also use the working memory 806 to store dynamic data created during one or more operations. The working memory 806 may include, for example, random access memory (RAM) such as a static random-access memory (SRAM) or dynamic random-access memory (DRAM), Double-Data-Rate DRAM (DDR-RAM), synchronous DRAM (SDRAM), an EEPROM, flash memory (e.g., NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 804 and working memory 806, it will be appreciated that the computing device 800 may include a single memory unit that operates as both instruction memory and working memory. Further, although embodiments are discussed herein including non-volatile memory, it will be appreciated that computing device 800 may include volatile memory components in addition to at least one non-volatile memory component.

In some embodiments, the instruction memory 804 and/or the working memory 806 includes an instruction set, in the form of a file for executing various methods, such as methods for next state prediction, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments, a compiler or interpreter converts the instruction set into machine-executable code for execution by the one or more processing resources 802.

The input/output devices 808 may include any suitable device that allows for data input or output. For example, the input/output devices 808 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 810 and/or the communication port(s) 812 allow for communication with a network. For example, if a communication network is a cellular network, the transceiver 810 allows communications with the cellular network. In some embodiments, the transceiver 810 is selected based on the type of the communication network the computing device 800 will be operating in. The one or more processing resources 802 are operable to receive data from, or send data to, a network, via the transceiver 810.

The communication port(s) 812 may include any suitable hardware, software, and/or combination of hardware and software that is capable of coupling the computing device 800 to one or more networks and/or additional devices. The communication port(s) 812 may be arranged to operate with any suitable technique for controlling information signals using a desired set of communications protocols, services, or operating procedures. The communication port(s) 812 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 812 allows for the programming of executable instructions in the instruction memory 804. In some embodiments, the communication port(s) 812 allows for the transfer (e.g., uploading or downloading) of data.

In some embodiments, the communication port(s) 812 couples the computing device 800 to a network. The network may include local area networks (LAN) as well as wide area networks (WAN), including, without limitation, Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 810 and/or the communication port(s) 812 utilizes one or more communication protocols. Examples of wired protocols may include, but are not limited to, Universal Serial Bus (USB) communication, RS-232, RS-422, RS-423, RS-485 serial protocols, Fire Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 814 may be any suitable display and may display the user interface 816. The user interfaces 816 may include one or more interface elements selected based on a next action prediction, as discussed above. In some embodiments, a user may interact with the user interface 816 by engaging the input/output devices 808. In some embodiments, the display 814 may be a touchscreen, where the user interface 816 is displayed on the touchscreen.

The display 814 may include a screen such as, for example, a Liquid Crystal Display (LCD) screen, a light-emitting diode (LED) screen, an organic LED (OLED) screen, a movable display, a projection, etc. In some embodiments, the display 814 may include a coder/decoder, also known as Codecs, to convert digital media data into analog signals. For example, the visual peripheral output device may include video Codecs, audio Codecs, or any other suitable type of Codec.

In some embodiments, the computing device 800 implements one or more modules or engines, each of which is constructed, programmed, configured, or otherwise adapted, to autonomously carry out a function or set of functions. A module/engine may include a component or arrangement of components implemented using hardware, such as by an application-specific integrated circuit (ASIC) or field-programmable gate array (FPGA), for example, or as a combination of hardware and software, such as by a microprocessor system and a set of program instructions that adapt the module/engine to implement the particular functionality that (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices) that execute an operating system, system programs, and application programs, while also implementing the engine using multitasking, multithreading, distributed (e.g., cluster, peer-peer, cloud) processing where appropriate, or other such techniques. Accordingly, each module/engine may be realized in a variety of physically realizable configurations, and should generally not be limited to any particular example implementation herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

In some embodiments, the computing device 800 may be a computer, a workstation, a laptop, a server such as a cloud-based server, or any other suitable device. In some embodiments, the computing device 800 is a server that includes one or more processing units, such as one or more graphical processing units (GPUs), one or more central processing units (CPUs), and/or one or more processing cores. The computing device 800 may, in some embodiments, execute one or more virtual machines. In some embodiments, processing resources (e.g., capabilities) of the computing device 800 are offered as a cloud-based service (e.g., cloud computing).

Although embodiments are illustrated herein including certain systems and/or devices, it will be appreciated that additional systems, servers, storage mechanism, etc. may be included. In addition, although embodiments are illustrated herein having individual, discrete systems, it will be appreciated that, in some embodiments, one or more systems may be combined into a single logical and/or physical system. Similarly, although embodiments are illustrated having a single instance of each device or system, it will be appreciated that additional instances of a device may be implemented. In some embodiments, two or more systems may be operated on shared hardware in which each system operates as a separate, discrete system utilizing the shared hardware, for example, according to one or more virtualization schemes.

It will be appreciated that identification of predicted next states and selection of corresponding actions, as disclosed herein, particularly on large network systems, is only possible with the aid of computer-assisted machine-learning algorithms and techniques, such as Bayesian linear estimations. In some embodiments, machine-learning processes, including Bayesian linear estimations, are used to perform operations that cannot practically be performed by a human, either mentally or with assistance, such as generation of one or more likelihood distributions. It will be appreciated that a variety of machine-learning techniques can be used alone or in combination to generate next state predictions, as disclosed herein.

Although the subject matter has been described in terms of example embodiments, it is not limited thereto. Rather, the appended claims should be construed broadly, to include other variants and embodiments that may be made by those skilled in the art.

What is claimed is:

1. A system, comprising:
a processor; and
a non-transitory computer-readable medium storing instructions that, when executed, cause the processor to:
provide to a user device for display on a user interface at least one engagement opportunity that includes a first interface element that provides corresponding functionality in response to user interaction;
generate, using a stack model, an initial state variable characterizing an estimate of an initial state, wherein the stack model generates the initial state variable based on a set of priors including the at least one engagement opportunity;
apply a non-linear transformation to the initial state variable and generate a decay factor characterizing a diminishing effect of the at least one engagement opportunity;
generate a set of likelihood estimates for the initial state using a Bayesian steady state filter model that receives the initial state variable and the decay factor characterizing the diminishing effect of the at least one engagement opportunity;
generate a next state variable characterizing a prediction of a next state based on the initial state variable and the set of likelihood estimates;
determine a second interface element to be included in the user interface based on the next state variable; and
provide to the user device for display on the user interface the second interface element.

2. The system of claim 1, wherein at least one posterior of the next state is estimated from Markov Chain Monte Carlo Sampling.

3. The system of claim 2, wherein the next state is a first next state, and wherein a second next state is generated using the at least one posterior of the first next state as a second set of priors for estimation.

4. The system of claim 1, wherein an interface element is selected for presentation to a user based on the next state.

5. The system of claim 1, wherein the instructions cause the processor to:
determine a category of the at least one engagement opportunity;
generate a set of likelihood estimates for the category of the at least one engagement opportunity;
determine whether the set of likelihood estimates for the category exceeds a predetermined threshold; and
in response to determining the set of likelihood estimates for the category exceeds the predetermined threshold, generate the set of likelihood estimates for the initial state.

6. The system of claim 1, wherein the non-linear transformation comprises a Hill transformation.

7. The system of claim 1, wherein the set of likelihood estimates comprises a set of maximum likelihood estimates.

8. A computer-implemented method, comprising:

providing to a user device for display on a user interface at least one engagement opportunity that includes a first interface element that provides corresponding functionality in response to user interaction;

generating, using a stack model, an initial state variable characterizing an estimate of an initial state, wherein the stack model generates the initial state variable based on a set of priors including the at least one engagement opportunity;

applying a non-linear transformation to the initial state variable and generate a decay factor characterizing a diminishing effect of the at least one engagement opportunity;

generating a set of likelihood estimates for the initial state using a Bayesian steady state filter model that receives the initial state variable and the decay factor characterizing the diminishing effect of the at least one engagement opportunity;

generating a next state variable characterizing a prediction of a next state based on the initial state variable and the set of likelihood estimates;

determining a second interface element to be included in the user interface based on the next state variable; and providing to the user device for display on the user interface the second interface element.

9. The computer-implemented method of claim 8, wherein at least one posterior of the next state is estimated from Markov Chain Monte Carlo Sampling.

10. The computer-implemented method of claim 9, wherein the next state is a first next state, and wherein a second next state is generated using the at least one posterior of the first next state as a second set of priors for estimation.

11. The computer-implemented method of claim 8, wherein an interface element is selected for presentation to a user based on the next state.

12. The computer-implemented method of claim 8, comprising:

determining a category of the at least one engagement opportunity;

generating a set of likelihood estimates for the category of the at least one engagement opportunity to generate;

determining whether the set of likelihood estimates for the category exceeds a predetermined threshold; and in response to determining the set of likelihood estimates for the category exceeds the predetermined threshold, generating the set of likelihood estimates for the at least one engagement opportunity.

13. The computer-implemented method of claim 8, wherein the non-linear transformation comprises a Hill transformation.

14. The computer-implemented method of claim 8, wherein the set of likelihood estimates comprises a set of maximum likelihood estimates.

15. A non-transitory computer-readable medium having instructions stored thereon, wherein the instructions, when executed by at least one processor, cause at least one device to perform operations comprising:

providing to a user device for display on a user interface at least one engagement opportunity that includes a first interface element that provides corresponding functionality in response to user interaction;

generating, using a stack model, an initial state variable characterizing an estimate of an initial state, wherein the stack model generates the initial state variable based on a set of priors including the at least one engagement opportunity;

applying a non-linear transformation to the initial state variable and generate a decay factor characterizing a diminishing effect of the at least one engagement opportunity;

generating a set of likelihood estimates for the initial state using a Bayesian steady state filter model that receives the initial state variable and the decay factor characterizing the diminishing effect of the at least one engagement opportunity;

generating a next state variable characterizing a prediction of a next state based on the initial state variable and the set of likelihood estimates;

determining a second interface element to be included in the user interface based on the next state variable; and providing to the user device for display on the user interface the second interface element.

16. The non-transitory computer-readable medium of claim 15, wherein the instructions cause the device to perform operations comprising:

determining a category of the at least one engagement opportunity;

generating a set of likelihood estimates for the category of the at least one engagement opportunity to generate;

determining whether the set of likelihood estimates for the category exceeds a predetermined threshold; and in response to determining the set of likelihood estimates for the category exceeds the predetermined threshold, generating the set of likelihood estimates for the at least one engagement opportunity.

17. The non-transitory computer-readable medium of claim 15, wherein an interface element is selected for presentation to a user based on the next state.

* * * * *